United States Patent [19]
Vallon

[11] Patent Number: 5,112,446
[45] Date of Patent: May 12, 1992

[54] DEVICE FOR PRODUCING FRESH WATER BY SOLAR ENERGY-DRIVEN SEA WATER DESALTING MEANS

[76] Inventor: Roger Vallon, 3,rue des pleins champs, F-76000 Rouen, France

[21] Appl. No.: 540,362

[22] Filed: Jun. 19, 1990

[30] Foreign Application Priority Data

Jan. 30, 1989 [FR] France ............................ 89 01449

[51] Int. Cl.⁵ .......................... B01D 3/10; C02F 1/14
[52] U.S. Cl. ............................ 202/185.2; 202/185.3; 202/205; 202/234; 202/267.1; 203/10; 203/11; 203/49; 203/DIG. 1; 203/DIG. 25
[58] Field of Search ........ 203/10, 11, 1, 90, DIG. 25, 203/91, DIG. 1, DIG. 17, DIG. 18; 202/181, 185.2, 185.3, 203, 205, 234; 159/903

[56] References Cited

U.S. PATENT DOCUMENTS

| | | | |
|---|---|---|---|
| 3,257,291 | 6/1966 | Gerber | 202/234 |
| 3,338,797 | 8/1967 | Hermansen et al. | 202/234 |
| 3,563,305 | 2/1971 | Hay | 126/434 |
| 4,172,767 | 10/1979 | Sear | 202/234 |
| 4,467,788 | 8/1984 | Peranio | 126/434 |
| 4,534,828 | 8/1985 | Erickson et al. | 202/176 |
| 4,595,460 | 6/1986 | Hurt | 202/185.2 |
| 4,926,763 | 5/1990 | Leroux et al. | 202/93 |

FOREIGN PATENT DOCUMENTS

| | | |
|---|---|---|
| 5044779 | 8/1979 | Australia . |
| 2830705 | 10/1980 | Fed. Rep. of Germany . |
| 3440842 | 5/1986 | Fed. Rep. of Germany . |
| 2372771 | 8/1978 | France ............................ 202/234 |
| 0608260 | 12/1978 | Switzerland ..................... 202/234 |

Primary Examiner—Wilbur Bascomb, Jr.
Attorney, Agent, or Firm—Brumbaugh, Graves, Donohue & Raymond

[57] ABSTRACT

A device for the production of fresh water from sea or brackish water is provided. The device contains one or more evaporation pans covered with a translucent material, one or more ascending chimney-gallaries the upper ends of which are open to the air and the lower ends of which are tightly connected to the evaporation pans and a fresh water collecting chamber. The communication between the evaporation pans and the chimney-gallaries is regulated such that it can be opened and closed so as to maximize efficiency. The communication between the bottom section of the chimney-gallery and the open air is likewise regulated. The device is especially suited for carrying out batchwise fresh water production by evaporation of sea or brackish water. The batchwise method can involve sequences according to circadian alternations, of an evaporation-condensation step followed by a step of cooling for the restoration of the initial conditions for a further step of evaporation-condensation.

8 Claims, 2 Drawing Sheets

DEVICE FOR PRODUCING FRESH WATER BY SOLAR ENERGY-DRIVEN SEA WATER DESALTING MEANS

FIELD OF THE INVENTION

The present invention relates to a device and a process for fresh water production and more particularly for the desalting of sea water to produce fresh water by using solar energy.

BACKGROUND OF THE INVENTION

Water from the oceans and the seas is a potential source of fresh water, provided that it is desalted beforehand, by distillation. Solar energy has long been proposed as the source of energy therefor.

Actually the solar energy-driven evaporation of sea water leading to the formation of salt deposits and the condensation of evaporated water by cooling is the fundamental phenomenon which rain is based on.

The prior art literature describes a lot of conditions, in which evaporation of sea water and the subsequent condensation and collecting of the fresh water thus obtained could be achieved, at least theoretically.

The apparatus disclosed in the German Patent Application DE-A-2 830 705 involves the carrying out of the evaporation and the condensation in a single wing-shaped canal.

The Australian Patent AU-B-532266 described the desalting of sea or brackish water by using two adjacent parallel canals both fed by said sea or brackish water and one of which comprises a greenhouse structure, whereas the second one comprises an appropriate second structure for condensing the vaporized water and recovering the condensed water, said second structure being in fluid communication with said greenhouse-like structure and mostly immersed in the other of said two canals.

U.S. Pat. application No. 3,338,797 described a sophisticated apparatus for transforming saline water into fresh water by solar energy and for generating electrical power from said fresh water. Said apparatus should comprise:

- several tanks, two of which are contiguous and comprise an open lattice work which serves as a support for a number of appropriately shaped blocks, useful for the condensation and collecting of the evaporated water,
- electro-mechanical means for conveying and pumping,
- a rotated screw used for moving salt from one tank upwardly to a salt box wherein said salt is discharged, and
- other means for conveying and collecting matters, equipped with appropriate valves and pumps.

The German Patent Application DE-A-3 440 842 disclosed a device and a method which comprised:

- a rudimentary system for collecting of the evaporated water, also comprising means for an artificial warming up, and
- a chimney-like system, the purpose of which was to raise the water vapor up to a height where the condensation occurred and enable using for irrigating grounds downwards and producing electricity the water thus obtained by condensation at the top.

There was still a need, therefore, for a device and a method for the production of fresh water by desalting sea or brackish water with a thorough control, under precise physical conditions and with a high efficiency, of the basic phenomena of evaporation and condensation, advantageously without any source other than the solar energy.

OBJECTS OF THE INVENTION

It is an object of the present invention to provide such a device and a process for fresh water production by desalting sea or brackish water.

It is a further object of this invention to provide a device and a process for fresh water production by sequential evaporation of sea or brackish water and condensation of the vapor thus obtained.

It is a further object of this invention to provide a device and a process for producing large quantities of fresh water by desalting sea or brackish water.

It is a further object of this invention to provide a device and a process for producing large quantities of fresh water by using substantially solely the sun energy for desalting sea or brackish water.

It is a further object of this invention to provide a device and a process for producing large quantities of fresh water by desalting sea or brackish water according to circadian alternations.

It is a still further object of this invention to provide a device and a process for batchwise fresh water production by evaporation of sea or brackish water involving sequences, advantageously according to circadian alternations, of an evaporation-condensation step followed by a step of cooling for the restoration of the initial conditions for a further step of evaporation-condensation.

SUMMARY OF THE INVENTION

The present invention relates to a device for the production of fresh water from sea or brackish water, comprising:

a) at least one evaporation pan, covered with a translucent material, b) at least one ascending chimney-gallery, the upper end of which is open to the air and the lower end of which is tightly connected to the said at least one evaporation pan, c) a fresh water collecting chamber, and d) means for the opening/closing of the communication between the evaporation pan and the chimney-gallery and for the closing/opening of a direct communication of the bottom section of the chimney-gallery with the open air.

This invention also relates to a process for the production of fresh water by desalting of sea or brackish water, comprising solar energy-driven evaporation of the said sea or brackish water fed into evaporation pans, introduction of the water vapor thus obtained into an ascending chimney-gallery for the condensation therein of the said water vapor, and collection of the condensed fresh water for immediate or subsequent use. According to a preferred embodiment of this technique the process is carried out with circadian alternations of evaporation-condensation during the day and cooling of the chimney-gallery during the night.

A further and preferred variation involves the spraying of cold water in the chimney-gallery, substantially from the top of the latter.

A still further and preferred variation involves, near the upper end of the ascending chimney-gallery, means for forcing the air circulation, means constituting a separate condensation chamber and means for spraying downwards into the chimney-gallery water collected in said condensation chamber.

BRIEF DESCRIPTION OF THE DRAWINGS

These and other objects and advantages of the invention will become apparent from the following description thereof, and from the accompanying drawings illustrating the same, in which.

SPECIFIC DESCRIPTION

The following description comprises continued reference to the drawings for the general arrangement of the invention.

According to the invention the aforesaid objects are achieved by a device comprising an evaporation pan, covered with a translucent material, at least one ascending chimney-gallery and a fresh water collecting chamber, as well as means for opening/closing the communication between the evaporation pan and the chimney-gallery and for the closing/opening of a direct communication of the bottom section of the chimney-gallery with the open air.

Figure 1:
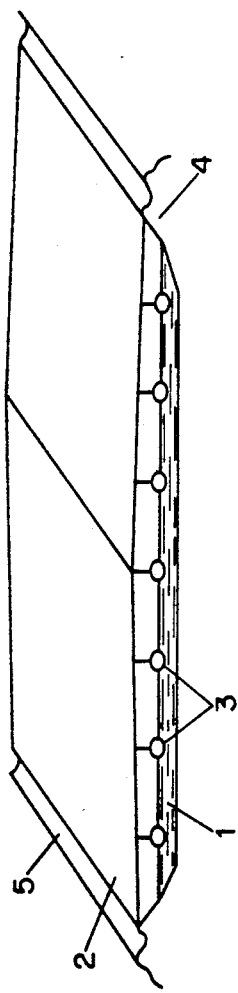
FIG. 1 is an elevational cross-sectional perspective view of a first portion of the device of the present invention, namely the evaporation pan.
Figure 2:
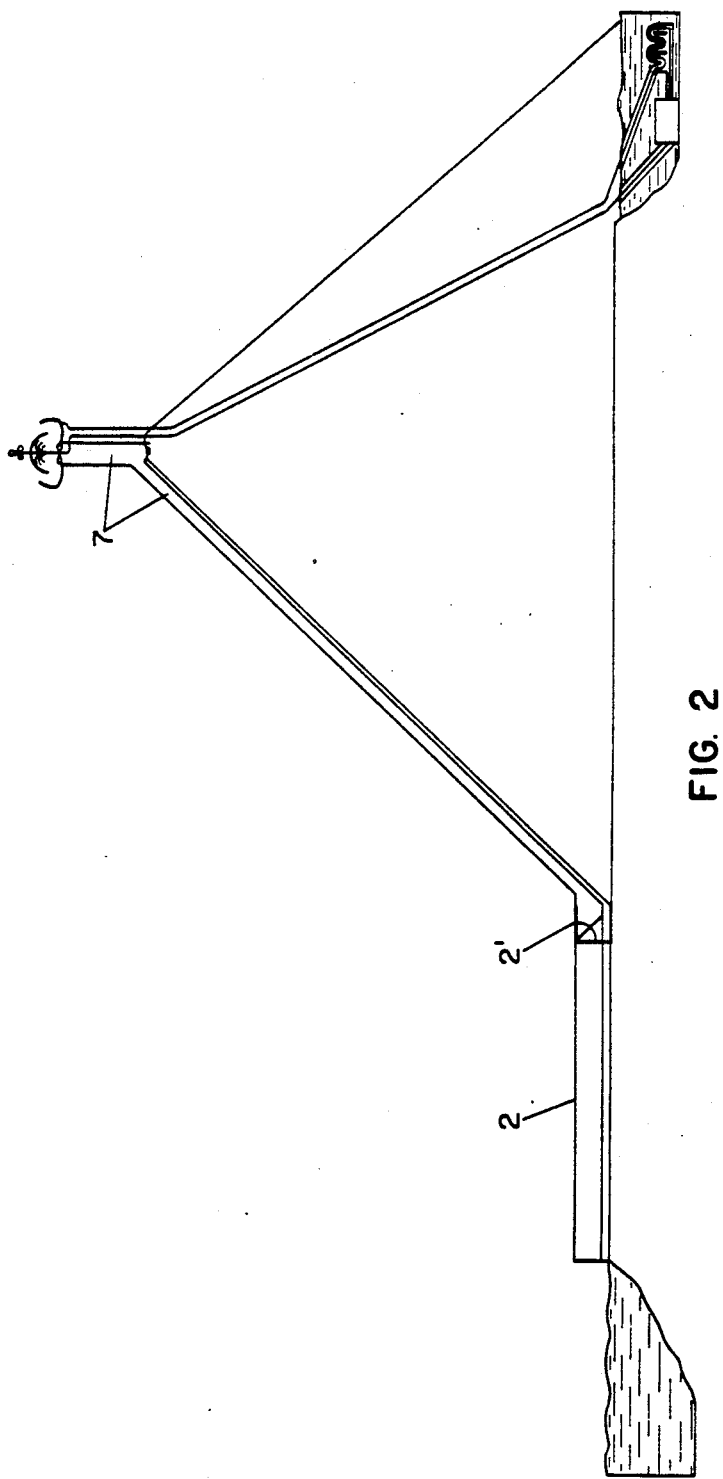
FIG. 2 is a fragmentary vertical cross-sectional view of the general structure of the device of the present invention.

According to the present invention and as it can be seen from FIGS. 1 and 2, the evaporation pan 1 can comprise wide and shallow canals to be flooded, either continuously or batchwise, with sea or brackish water and which are covered with a vault 2. It can also comprise at least one long and narrow canal, but covered with a higher vault. Said vault should advantageously be made of a light translucent highly thermically isolating long lasting material. The vault is preferably made of a translucent material selected from the group consisting of polycarbonate or polyvinylchloride films, sheets and plates, and more especially from such films comprising entrapped bubbles.

The evaporation canal, thus covered with the vault, leads near one of its ends into the lower end of an ascending chimney-gallery, at the foot of a hill or a mountain.

When this is more appropriate the chimney-gallery can be replaced with a network of ascending galleries, at least one of which terminates in a chimney at its upper end.

The ascending chimney-gallery or network of ascending galleries terminating in at least one chimney ensures rapid aspiration of the hot, vapor-saturated air produced under the vault. Along the ascending chimney-gallery the vapor will naturally cool down and most of it will condensate in the gallery. During the hot hours of the day, water evaporates from the canal and condensates mainly in the upper portion of the gallery. Said condensation occurs by thermal exchange with cool surfaces in the chimney-gallery and can be forced by the presence within said gallery of additional materials, such as rocks, pebbles, metal collectors, concrete walls or the like, and/or by spraying of relatively cool water on captors or in the free space in the said chimney-gallery.

According to a preferred embodiment, during the night the vault or at least its end facing the chimney-gallery is closed and the chimney-gallery and the materials therein, if any, are cooled by the stream of cold air circulating inside, once the lower end of the chimney-gallery is set in communication with the open air. This can be accomplished by any known means, e.g. by a rotatable blanking plate 2' of the general type as illustrated on FIG. 2. At the end of a complete circadian period of time, as many calories will have been evacuated by night-time cooling as will have been collected during the day under the translucent vault.

The main parameters which those with an ordinary skill in the art should take care of for determining the efficiency of this set-up are the translucency of the vault, the height of the gallery, the temperatures in the gallery and the specific weight of the circulating air. The efficiency of the evaporation step is enhanced by the movement of the air above the water surface.

The dimensions of the vault should be determined by the available driving power, which in turn is a function of the available height of the ascending chimney-gallery and of the solar irradiation yield.

The vault should advantageously be such that enough air circulation can be obtained so that the temperature and hygrometry of the circulating air are maintained just below the point where condensation will occur on the walls of the vault.

Power losses in the vault and gallery will be substantially compensated by the driving power of the chimney-gallery. To help regulate air circulation, a variable opening shutter can be positioned at the upper end of the chimney-gallery. As an example temperatures of 60°-70° C. can be reached, with an hygrometry of 75-85%, in the evaporation zone and each $m^3$ air circulated therein in these conditions comprises close to 200 g water.

Water production by such an installation is a function of the solar energy received by the site. Under favorable climatic conditions (i.e. high sun-lighting throughout the year) the average production can reach up to 6 l/day/$m^2$ offered to sun-lighting.

This installation can advantageously be completed by a system of reflectors disposed near the vault so as to reflect light onto it.

According to a further embodiment the water collected in a special separate condensation chamber 6 and to be used for spraying in the chimney-gallery can be stored during the day under a white film so as to minimize warming thereof by sunlight and under a black film during the night so as to favor cooling by radiation.

As a further embodiment the relatively high vault can be replaced by a flat pliable sheet of translucent plastic material, preferably having a high thermal insulation coefficient and placed substantially horizontally a few tens of centimeters above the water surface in the evaporation pan. This is especially preferred in cases where a large non-settled area bordering the sea can be used. When these conditions are present the narrow and long canal can be replaced by a series of wide, shallow pans, each approximately 100-200 m wide and about 1000 m long. In this case, due to the larger surface of the canal, the driving power losses are reduced. Advantageously said pliable sheet will be supported by a series of plastic buoys 3, connected together and to the shores of the pan by, e.g., Nylon cables, which do also secure the plastic sheet. This embodiment allows for the plastic sheet to be folded back by dragging the buoys to one end of the pan, so as to uncover the latter whenever it is to be cleaned of salt deposits.

Each pan can be connected to an aspiration ascending chimney-gallery 7, the exact dimensions of which shall be calculated so as to create a driving power capable of equilibrating the power losses occurring under the said sheet and in the gallery itself. A substantial increase of the aspiration power can be obtained by placing at the top of the chimney-gallery a static suction fan 15, possibly completed with a wind engine 8.

According to an especially preferred embodiment a condensation chamber 6 is installed atop each chimney. This chamber operates according to the same principle as the one described above, i.e. by contact of the vapor-saturated air with cold walls and with cold water droplets pulverized under low pressure in the said condensation chamber. The condensed water is retrieved at the bottom of the chimney-gallery and, as far as the spraying of cold water is concerned, from gutters 9 located all around the bottom of the said condensation chamber.

Figure 3:
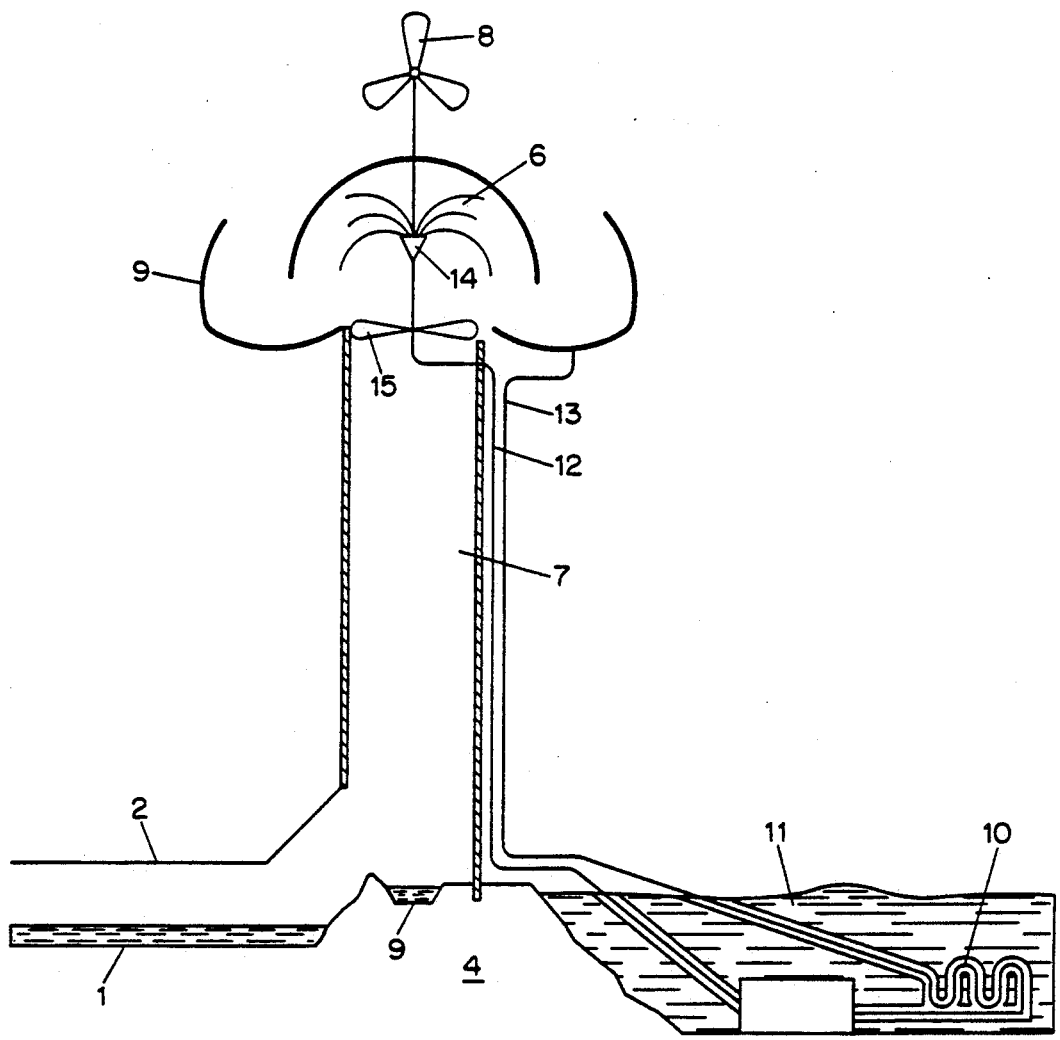
FIG. 3 is a fragmentary cross-sectional view of an alternative embodiment of the device according to this invention.

According to another embodiment, illustrated on FIG. 3 and which is especially preferred in cases where no sufficient relief is available to provide a support for the chimney-gallery, the said chimney-gallery is replaced with an aspiration vertical tower, to the bottom of which is connected an evaporation pan or group of evaporation pans. This is especially appropriate in cases where no sufficient relief is available to provide a support for the aforesaid chimney-gallery. All that what was said hereinabove for the chimney-gallery applies *mutatis mutandis* to the tower. This tower, advantageously cylindrical, is preferably a few meters in radius and a few dozens meters high. Here again the exact dimensions of said tower shall be calculated so as to create a driving power capable of equilibrating the power losses occurring under the aforesaid sheet and in the tower itself, and a substantial increase of the aspiration power can be obtained by placing at least one static suction fan 15 at the top of the tower. This set-up is essentially compact, with e.g. a dam 16 separating the sea from the evaporation pans. The sea water and air are fed from the inland end of the pans. On the sea-facing end of the pan the tower aspirates the vapor-saturated air, and the brine produced by the concentration of the salt by evaporation is evacuated back into the sea.

Advantageously the water to be sprayed in the said condensation chamber is taken from the said gutter 9 and cooled down by means of a simple heat-exchanger 10 immersed in the nearby sea 11. This spraying water circulates under low pressure, provided in part by the height of the chimney-gallery or tower and in part by a pump which can be wind-driven, e.g. by means of a static suction fan 8.

Figure 4:
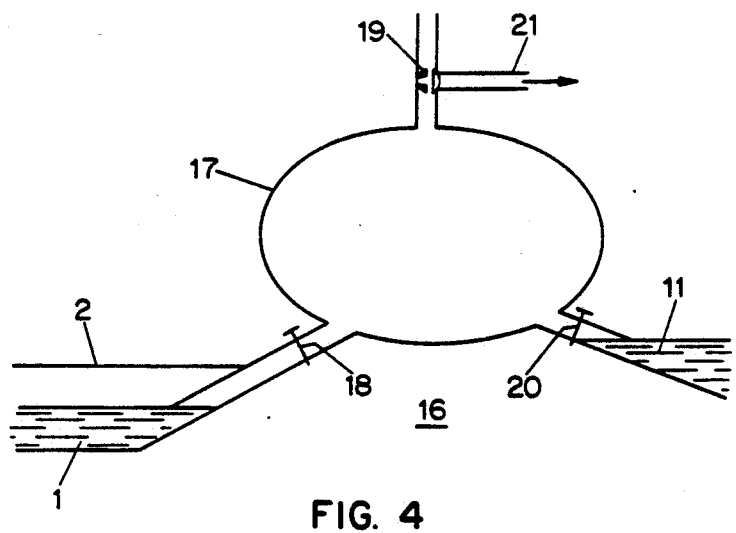
FIG. 4 is a fragmentary vertical cross-sectional view of a vacuum lock for the evacuation of the brine, which is an optional portion of the device of the present invention.

Although somewhat detrimental to the yield of the process, evacuation of the brine is highly recommended to avoid excessive crystallisation of salts within the pans. In most cases said evacuation can be performed at a salt concentration just below that at which gypsum is formed. To feed the water into the pans and evacuate the brine therefrom, the system to be used corresponds advantageously to one of the following embodiments thereof, depending on the height of the tide of the sea:

When the difference between the levels of high and low tide is small, the sea water is fed into the pans by gravity, the surface of the pans being located below that of the sea. The brine is pumped (see FIG. 4) by means of a vacuum-lock 17, preferably consisting of a tank placed, e.g. on the dam 16, slightly above the sea level, and equipped with three electric valves; valve 18 is connected to the pan via a pipe, whilst valve 20 faces the sea and valve 19 is connected alternatively to the atmosphere and to a vacuum pump 21. When valve 18 is open and valve 19 is connected to the pump, the hyper-salted water is admitted into the tank. When said tank is substantially full, valve 18 is closed, valve 20 is open and valve 19 is switched to admit air into the tank, thus releasing the salted water into the sea. Each pan is preferably connected to a tank, whereas a single vacuum pump can operate continuously and be connected successively to each of the tanks.

When the tide is usually high enough sea water is admitted at high tide into an intermediate reservoir located inland, which is used to feed water into the pans 1 when the tide is low. The surface of the pans should be above the level of low tides, so that the hyper-salted water can be evacuated by gravity directly into the sea during most of the tide cycle.

A non-limiting example of such an installation comprises a series of 4 pans 40 m wide and 1000 m long, connected to a single aspiration tower (about 35 m high, 8 m in diameter) topped with a condensation chamber. The pans are placed perpendicular to the dam separating them from the sea. The bottom of the pans should preferably have a slight slope towards the dam. The pans are covered with a sheet of a polycarbonate cellular plastic film. To ensure better thermal insulation properties and increased durability, said sheet is made of two thin sheets molded together so as to enclose inbetween bubbles of a chemically neutral gas, such as nitrogen. This sheet is placed about 50 cm above the water surface and is supported by a network of buoys. Advantageously the sheet is slightly slanted, so as to collect rain water into gutters located between the pans. When the average total sun lighting reaches 350 W/m$^2$/h, one can obtain about 600 m$^3$ fresh water per day per tower. The driving power of each tower, i.e. approximately 6 mm water, equilibrates the power losses in the pans and in the tower.

The evaporation is directly dependent upon the total radiation at the contemplated site. The lower the latitude and the lower the rainfall, the more intense the radiation. Thus, e.g. at Gabes in Tunisia, the sun lighting averaged on five past years amounted to 541 Gcal/m$^2$/day, that is to say 5.33 KWh on an average of 8.86 hours or 600 W/h.

When considering an average yield of 90% for the light transmission through a polycarbonate sheet, one can dispose per day of a power of 4.791 KW, on an annual average, for evaporating 7.6 l of water per m$^2$ exposed to the sun.

According to this invention both the evaporation and the condensation are monitored through an important movement of the air, generated by the means as described hereinabove.

The driving power should, for a given air flow, compensate for the loss of head induced by the circulation of air in the evaporation zone and in the chimney-gallery or the tower. The driving power d can be calculated with the formula:

$$d = H \cdot y \cdot \left( \frac{1}{1 + a_1\theta} - \frac{1}{1 + a_2T} \right),$$

wherein H is the height in m of the chimney-gallery or tower, y is the specific weight of dry air at 0° C., $\theta$ and T are the temperatures respectively inside and outside the chimney-gallery or tower, and $a_1$ and $a_2$ are the specific weights of the air respectively at $\theta$ and T° C.

For a 600 m high chimney-gallery this power would be of 78 mm of water column (N.B.: 1 Pascal = 1/10 mm of water column). With a tower of 40 m in height and 8 m in diameter said power falls to 7 mm of water column. The pressure drop should consequently be adjusted to the available power and the volume of hot air transferring the water vapor generated within the evaporation zone for a given period of time. Said pressure drop h can be calculated through the formula $$h = k \cdot \frac{L \cdot P \cdot Q^2 \cdot \epsilon}{S^3},$$

wherein k is the factor of friction on the walls, L is the length in m, P is the perimeter, Q is the flow rate, S is the cross-section in m² and is the specific weight of the transported air.

Owing to the figures indicated for d hereinabove and to the flow of air which is needed for transferring the water quantity liable to be evaporated, one can thus use in combination with a chimney-gallery 600 in high an evaporation zone of 10000 m in length, with a vault of 25 m in width, whereas the evaporation zone can be limited to 1000 m in length and 160 m in width when it is combined with a tower about 40 m high and 8 m in diameter.

The economical profitability of such an installation is to be determined by referring to the economical value of the end product, i.e. fresh water, mainly usable for irrigation and, under some conditions, for human and animal consumption.

I claim:

1. A device for the production of fresh water from sea or brackish water, comprising:
   (a) at least one evaporation pan, covered with a translucent material;
   (b) at least one ascending chimney-gallery, the upper end of which is open to air and the lower end of which is connected to at least one evaporation pan, wherein said at least one chimney-gallery condenses water vapor generated from the at least one evaporation pan;
   (c) a condensate collecting chamber;
   (d) means for opening and closing of the communication between the at least one evaporation pan and the at least one chimney-gallery and for closing and opening of a direct communication of the bottom section of the chimney-gallery with the air;
   (e) near the upper end of the ascending chimney-gallery, means for forcing air circulation;
   (f) means constituting a separate condensation chamber; and
   (g) means for spraying downwards into the chimney-gallery water collected in the condensation chamber.

2. A device according to claim 1, wherein the at least one evaporation pan comprises at lest one canal of approximately 100-200 meters wide and 1000 meters long covered with a vault.

3. A device according to claim 1, wherein the at least one evaporation pan comprises at least one canal of approximately 25 meters wide and 10,000 meters long covered with a vault.

4. A device according to claim 1, wherein the chimney-gallery is an aspiration vertical tower, to the bottom of which is connected at least one evaporation pan.

5. A device according to claim 1, wherein the translucent material is selected from the group consisting of polycarbonate or polyvinylchloride film, sheets and plates.

6. A device according to claim 1, wherein the spraying water is cooled down by means of heat-exchangers immersed in the sea.

7. A device according to claim 1, further comprising a vacuum lock for the evacuation of brine from the pan.

8. A device according to claim 1 further comprising a means for evacuation of the at least one evaporation pan.

* * * * *